United States Patent [19]

Cohen et al.

[11] 4,119,477
[45] Oct. 10, 1978

[54] SIZE COMPOSITIONS FOR GLASS FIBER REINFORCED CEMENTITIOUS PRODUCTS

[75] Inventors: Eleanor B. Cohen, Granville; William N. Stassen; James C. Wintgens, both of Newark, all of Ohio

[73] Assignee: Owens-Corning Fiberglas Corporation, Toledo, Ohio

[21] Appl. No.: 820,200

[22] Filed: Jul. 29, 1977

[51] Int. Cl.$^2$ .................. C04B 31/06; C08L 7/00
[52] U.S. Cl. ..................... 106/99; 260/29.7 NQ; 428/391; 428/392
[58] Field of Search .............. 260/29.7; 106/99; 428/391, 392, 394, 395

[56] References Cited

U.S. PATENT DOCUMENTS

| | | | |
|---|---|---|---|
| 2,738,285 | 3/1956 | Biefeld et al. | 106/99 |
| 3,116,192 | 12/1963 | Eilerman | 260/29.7 N |
| 3,718,449 | 2/1973 | Fahey | 65/3 |
| 3,853,605 | 12/1974 | Fahey | 260/29.3 |
| 3,867,328 | 2/1975 | Fahey | 260/29.3 |
| 3,876,405 | 4/1975 | Eilerman | 260/29.3 |
| 3,925,286 | 12/1975 | Fahey | 260/29.3 |
| 3,956,565 | 5/1976 | Bolen et al. | 428/392 |
| 4,039,716 | 8/1977 | Johnson | 428/392 |

*Primary Examiner*—O. R. Vertiz
*Assistant Examiner*—Mark Bell
*Attorney, Agent, or Firm*—Ronald C. Hudgens; Patrick P. Pacella

[57] ABSTRACT

Elastomeric size compositions for glass fiber reinforced cementitious products are disclosed. These size compositions show strong improvements in all phases of strand integrity with especially improved performance in wet integrity. This in turn improves the strand's workability in a cementitious matrix.

15 Claims, No Drawings

SIZE COMPOSITIONS FOR GLASS FIBER REINFORCED CEMENTITIOUS PRODUCTS

This invention relates to a sizing composition. In one of its more specific aspects, this invention relates to a sizing composition for glass fibers which are incorporated into a cementitious matrix.

It has long been known, as described in Slayter U.S. Pat. Nos. 2,703,762 and 2,781,274, to employ glass fibers in the reinforcement of cementitious products, including hydrous calcium silicate crystals, cement, concrete, mortar, and like matrices having a high alkali content. Glass fiber reinforcement contributes significantly to the overall strength of such cementitious products by reason of the high strength and flexibility of the glass fibers.

Until the last decade, it has not been advisable to use glass fibers for long term (five or more years) reinforcement of cement, concrete, mortar, or other cementitious materials or matrices that have a high alkali content. The harsh alkali environment would degrade the types of glass fibers, E glass for example, commonly used to reinforce non-alkali materials such as plastics.

In more recent years, alkali-resistant glass fibers have achieved widespread acceptance. Such alkali-resistant glass fibers are described in U.S. Pat. Nos. 3,840,379; 3,861,927; and 3,861,926. It is now generally recognized that glass fibers formed from glass as described in such patents have significantly greater alkali resistance than other conventional glass fibers, such as E glass fibers which have been in commercial use for some time and are described in U.S. Pat. No. 2,334,961.

Present sizes for alkali-resistant glass fibers for concrete and mortar reinforcement have a performance history which is less than satisfactory. At times, the properties of conventional strands appear good. At other times, however, there is an overall non-uniformity in properties. When the properties drop to the lower extremes, they become very inadequate.

One problem appears to the strand integrity. If the integrity of the strand is somewhat low for the application being considered, excessive filamentation of the strand results which in turn reduces the workability of the cementitious mix to undesirable levels. Run-out of the strand from the forming package also may be a problem. In conventional sized strands, break-outs seem to occur more often than is desired during chopping. Both strand integrity and run-out are related. Usually, one can be improved at the expense of the other.

When strand integrity is low, problems of extensive filamentation occur in dry blending the glass with a cement matrix, as well as in wet mixes. The filamentation gives processing problems usually described as a reduced workability for wet mixes. A tough sizing, however, which bonds filaments together effectively within a strand to give high integrity, also will bond the whole strand strongly to the package. Thus, integrity is limited by the requirement of good run-out unless processing changes are made which allow integrity to be developed after run-out has been completed as in a damp chop operation followed by drying, or by eliminating the run-out altogether as in a wet chop operation at the bushing followed by drying.

We have discovered elastomeric size compositions that yield a sized strand for glass fiber reinforced cement and concrete applications that is by far superior to other sized strands. The size compositions of this invention show strong improvement in all phases of strand integrity with especially improved performance in wet integrity. This is turn improves the workability of the strand in a cementitious matrix.

The elastomer in the size composition of this invention is meant to include natural rubber in the cured or uncured stage, vulcanized or unvulcanized stage. It also includes synthetic elastomeric or rubber-like materials such as neoprene, butadiene, chloroprene, isoprene, and the like or copolymers thereof with acrylontrile, styrene, and the like and especially the elastomeric materials which are curable or vulcanizable by thermal reaction to a set stage with a peroxide or through-sulfur linkages. The term includes these synthetic elastomeric or rubber-like materials in their cured or uncured stages, vulcanized or unvulcanized stages. Elastomer also is meant to include modified natural rubbers such as chlorinated rubbers and the like.

The preferred elastomer of this invention is styrene-butadiene rubber. Styrene-butadiene rubber manufacture involves copolymerization of about 3 parts butadiene with 1 part styrene. These materials are suspended in finely divided emulsion form in a large proportion of water in the presence of some kind of a soap or detergent. Also present in small amounts are an initiator or catalyst which is usually a peroxide and a chain-modifying agent (usually a mercaptan such as dodecyl mercaptan). The polymerization process usually requires 5 to 15 hours, at the end of which the water contains suspended finely divided globules of synthetic rubber, i.e., a rubber latex. The reaction is stopped at the desired time by adding an active reducing agent such as hydroquinone, referred to as a short stop.

The unreacted starting materials are vaporized to remove them from the latex and recover them for recycling. A rubber stabilizer (antioxidant such as phenyl-beta-naphthylamine) and other materials are often added at this point and the latex then coagulated by adding sodium chloride and various acidic materials. Crumbs of synthetic rubber form are filtered, washed, and dried to produce a product with physical appearance and properties similar to natural gum rubber. The material is white at first but quickly turns brown due to slight oxidation.

In addition to the foregoing, the aqueous size of this invention can include a silane such as vinyl-tri (beta-methoxyethoxy) silane or gamma-aminopropyltriethoxy silane, an acid such as glacial acetic acid, lubricants, surfactants, and the like, the balance being water.

The amount added of each material generally is of the order of 0.05 to 5% of the size composition. Two to 20% of the size composition, preferably 4 to 10%, will be the elastomer.

The size of this invention can be applied to a single filament or to a multiplicity of filaments in any suitable manner. Preferably, it will be applied to a plurality of filaments from a conventional applicator, the filaments being collected into a roving package which is oven dried at about 265° F. The oven dried forming stock is then fabricated into roving packages comprising glass filaments having adhered to their surface a solid formed by the evaporation of the aqueous portion of the size, the solids comprising about 1.5–2.5 weight percent of the total strand weight, with 1.5–2.0 weight percent solids being preferred. In this respect, it is important to note that for best performance of the size of this invention, the strand solids is determinative rather than the solids content of the size.

While the size of this invention can be applied to any glass fibers, it is well adapted to glass filaments having diameters less than 0.001 inch.

In a broad sense, the glass fibers of this invention can be any well-kown glass fiber or alkali-resistant glass fiber although the preferred form of this invention uses alkali-resistant glass fibers. Alkali-resistant glass fibers are now well known to those skilled in the art and are commercially available. In general, the glass from which alkali-resistant glass fibers are formed contains relatively high levels of zirconia, usually in amounts of the order of 5-25%. Most alkali-resistant glass fibers are:

|  | Parts by weight |
|---|---|
| $SiO_2$ | 55 – 80% |
| Alkaline earth metal oxide(s) (CaO, MgO, BaO, etc.) | 4 – 20% |
| Alkali metal oxide(s) ($Na_2O$, $K_2O$, etc.) | 1 – 20% |
| $ZrO_2$ | 5 – 25% |
| $TiO_2$ | 0 – 10% |

In addition, these alkali-resistant glasses may also contain amounts of alumina, chromium oxide, tin oxide, and the like. Such alkali-resistant glass fibers are described in U.S. Pat. Nos. 3,840,379; 3,861,927; and 3,861,926.

There are many other well-known glass fibers that are commercially available. The most widely known of these are E glass fibers, which are described in U.S. Pat. No. 2,334,961 issued on Nov. 23, 1943.

The size composition of this invention will impart high strand integrity (high filamentation resistance) to the strands. The high integrity leads to more workable cementitious mixes where the strand may be mixed longer without excessive filamentation.

Strands of glass fibers are produced by pulling several hundred or more tiny molten streams of glass which issue from holes in the bottom of a molten glass tank over a size applying apron to a gathering shoe which groups the fibers together into a strand. This strand then proceeds to a traverse mechanism and winding drum which provides the pulling action which attenuates the molten glass and coils the strand into a package. The fibers are individually separated at the time that they pass over the size applicator, so that the surfaces of the fibers are substantially completely coated before they are drawn together into a strand.

While the term "glass fibers" is employed to define continuous glass fibers in the form of filaments, strands, yarns, bundles, and cords, it is also intended to include discontinuous fibers in the form of glass wool fibers and yarns and fibers of the continuous or discontinuous types which have been cut, chopped, or otherwise reduced to shorter lengths but preferably to lengths greater than ¼ inch. Included also are the crimped continuous or discontinuous fibers or strands, yarns, and threads formed of the combination of crimped or uncrimped continuous and discontinuous fibers and fibrous budnles which have been plied or twisted in multiple groups to form yarns and cords.

While the preferred length of the glass fibers we employ in this invention ranges from ¼ to 2 inches, we do not intend to exclude the use of continuous glass fibers. The total amount of fibers employed ranges from 1 to 40% by weight of cementitious material. Preferably, the total amount of fiber ranges from 2 to 25%.

Pulverizing naturally occurring hydraulic calcium silicate clinker produces hydraulic cement. The clinker generally includes silica, alumina, lime, iron oxide, and magnesia. The resulting powder hardens when mixed with water. Hydraulic cements include Portland, calcium-aluminate, magnesia, natural, masonry, pozzolana, and slag cements.

In many applications, fibers are combined with cementitious materials in accordance with known techniques such as the use of a spray gun in which the fibers are chopped, combined with cement, and sprayed onto a surface to form the glass fiber reinforced cementitious product.

If desired, it is believed possible to use other fibrous materials in addition to the sized glass fibers of this invention. These include asbestos fibers, mineral wool, and organic fibers such as wood pulp.

All fibers, whether employed in the form of continuous or chopped strands, are distributed throughout the cementitious material whereby the cementitious material forms a continuous phase with the fibers distributed and randomly dispersed throughout the cementitious materials in a discontinuous phase.

Having described the basic concepts of the invention, reference is now made to the following example which is provided by way of illustration, and not by way of limitation, of the practice of the invention in the manufacture of reinforced cementitious products made with the blends of this invention.

EXAMPLE I

An alkali-resistant glass having the following composition:

| Ingredient | Weight Percent |
|---|---|
| $SiO_2$ | 61.1 |
| CaO | 5.1 |
| $Na_2O$ | 14.4 |
| $K_2O$ | 2.6 |
| $ZrO_2$ | 10.4 |
| $TiO_2$ | 6.0 |
| $Al_2O_3$ | 0.3 |
| $Fe_2O_3$ | 0.2 | is formed into glass fibers using conventional techniques.

The fibers were made by drawing molten glass from a bushing having 204 orifices therein into individual fibers having a diameter of approximately 0.00055 inch. These individual fibers were coated with an aqueous solution of the following size and were gathered into a strand that was coiled into a package and dried:

| Ingredient | Weight Percent |
|---|---|
| styrene-butadiene latex*(50% solids) | 20.0 |
| gamma-aminopropyltriethoxy silane, A-1100 | 1.0 |
| glacial acetic acid | 0.3 |
| aqueous emulsion of a tertiary amine, Protamine 65-20 (emulsifiable fatty acid tertiary amine of the formula B-C-$NB_2$), where R is a fatty acid group and $R_2$ is a lower alkyl group | 1.0 |
| water, deionized | balance |

*The styrene-butadiene latex we employed is Dow Latex 460, which employs a non-ionic styrene-butadiene polymer. Dow 460 is a latex of polymer particles dispersed in water. The latex has a specific gravity of 1.01 at 25° C and a weight per gallon of 8.4 pounds at 25° C. Dow 460 has a pH of 10.5 and a shelf life greater than two years.

We also coated some of these same glass fibers in a similar manner with the following control size composition.

| Ingredient | Weight Percent |
| --- | --- |
| caprylic acid-tetraethylene pentamine condensate solubilized with acetic acid, Cirrasol 185AN | 0.1 |
| Pelargonic acid-tetraethylene pentamine condensate solubilized with acetic acid, Cirrasol 185AE | 0.2 |
| polyethylene glycol, Carbowax 100 | 0.2 |
| gamma-aminopropyltriethoxy silane, A-1100 | 1.0 |
| polyvinylacetate plasticized with dibutyl phthalate, 25-1048 | 12.9 |
| glacial acetic acid | 1.2 |
| water, deionized | balance |

The control size is the best conventional size for glass fiber reinforced cementitious products of which we are aware. A summary is given in Table I, where zero (0) represents no significant change from the control, plus (+) represents improvement, and minus (−) represents a loss in property.

Table I

| | Strand Solids(%) | Wet Integrity | Dry Integrity | Chemical Resistance | Workability of mix | Integrity of Strand | Run-Out |
| --- | --- | --- | --- | --- | --- | --- | --- |
| Control | 2.0 | 0 | 0 | 0 | 0 | 0 | 0 |
| SER | 1.9 | + | + | ++ | ++ | ++ | 0 |
| Sizing Parameters Involved | | 1 "Chemical" resistance | 1 Resistance to mechanical abuse (impact action) | 1 Chemical resistance | 1 Chemical resistance | 1 Chemical resistance | |
| | | 2 Resistance to mechanical abuse (shearing action) | | | 2 Resistance to mechanical abust (tumble action) | 2 Resistance to mechanical abuse (tumble action) | |

Wet integrity determinations were made by means of a slump procedure. The wet integrity properties reflect the size compositions' ability to withstand mechanical abuse and chemical attack by a high pH, abrasive aqueous medium. This procedure involves mixing 1% of ¼ chopped strands into a cement/sand/water slurry for three minutes. A cone is filled with the slurry, inverted, and removed. The water content of the control is adjusted to give a slump of about 25% of the original height of the cone. Slumps of the samples are then expressed as the ratio of measured slump divided by the slump of the control determined the same day. All variables were the same except for the size composition. Our results indicated that the wet integrity of the sized strands of this invention were superior to the control.

Wet integrity determinations by means of measurements of the extent of filamentation were also made in the laboratory. A mix similar to the one used for the slump procedure was subjected to mixing periods of up to 30 minutes. Every three minutes a small sample was removed and through careful rinsing on a screen the glass fibers were separated. The dried fibers were then compared with a similar set obtained for the control. These results indicated that under prolonged mixing conditions the wet integrity of the sized strand of this invention was better than that of the control.

We made dry integrity determinations by the following procedure. This procedure involves mixing 4% of ¼ inch chopped strands into dry cement and recording the mixing times needed to give 50% filamentation. Being a dry mix of cement and chopped strands, the test gives a measure of the strands' ability to withstand mechanical abuse. The dry integrity of strands sized with these compositions were good.

The chemical resistance basically involves a strand exposure to a high pH aqueous medium. Sized strands are exposed to aqueous solutions of saturated calcium hydroxide ($Ca(OH)_2$), 1% sodium hydroxide (NaOH), and 1% potassium hydroxide (KOH) for 48 hours. The extent of filamentation then is recorded and compared. The evaluation indicates that the sizes of this invention have especially good chemical resistance to high pH media and are superior to the control.

Workability and strand integrity measurements were made for concrete mixes containing one inch chopped strands. During these evaluations small portions of the mix were taken following each mixing period. Through water rinsing, the glass fibers were separated from the matrix and dried for visual record of strand breakdown. The procedure we followed included mixing Portland cement, #8 gravel, sand, water, and glass fibers in a concrete mixer. The water/cement ratio was 0.55 and the volume of glass fibers was 1.0%. The water, cement, gravel, and sand were placed into the mixer while the mixer was operating, and glass fibers were added over a one-minute period and then mixed for one more full minute. Slump as previously described was measured. The mix continued for three more minutes followed by slump determinations. The three-minute procedure was followed twice more for a total mixing time of all ingredients of ten minutes. The visual observations and slump measurements taken every three minutes indicate that the new sizes are excellent improvements over the control in terms of workability and filamentation rating.

On forming and run-out evaluations, the size compositions of this invention gave acceptable levels of strand solids with good run-out. The strands of this invention represent no significant change from the control.

While this invention has been described with reference to the use of an elastomer, it will be understood that various changes and modifications can be made in the details of material, procedure, formulation, and use without departing from the spirit of the invention, especially as defined in the following claims.

We claim:

1. A plurality of filaments, at least a portion of the filaments' surfaces being in contact with the residue produced be evaporating water from an aqueous size composition consisting essentially of the following in weight percent: from 2 to 20% of an elastomer, from 0.05 to 5% of a silane from 0.05 to 5% of acetic acid, and from 0.05 to 5% of an emulsifiable lubricious tertiary fatty acid amine having the formula

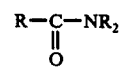

where R is a fatty acid group and $R_2$ is a lower alkyl group, and the remainder being water.

2. Glass filaments according to claim 1 wherein the residue comprises from 1.5 to 2.5 weight percent of the total weight of the glass filament and the residue.

3. Glass filaments according to claim 2 wherein the weight percent of residue ranges from 1.5 to 2.0.

4. Glass filaments according to claim 1 wherein the glass filament is made up of alkali-resistant glass fibers.

5. Glass filaments according to claim 1 wherein the elastomer is a synthetic elastomeric material.

6. Glass filaments according to claim 1 wherein the elastomer is styrene-butadiene rubber.

7. A sizing composition consisting essentially of the following in weight percent: from 2 to 20% of an elastomer, from 0.05 to 5% of a silane from 0.05 to 5% of acetic acid, and from 0.05 to 5% of an emulsifiable lubricious tertiary fatty acid amine of the formula $$R-\underset{\underset{O}{\|}}{C}-NR_2$$

where R is a fatty acid group and $R_2$ is a lower alkyl group, and the remainder being water.

8. A sizing composition according to claim 7 wherein the elastomer is a synthetic elastomeric material.

9. A sizing composition according to claim 8 wherein the elastomer is styrene-butadiene rubber.

10. A size composition according to claim 9 wherein 4 to 10 weight percent of the size composition is the elastomer.

11. A cementitious product comprising a composite of reinforcing materials and a cementitious matrix wherein one of the reinforcing materials comprises at least one glass fiber strand comprising a plurality of glass filaments according to claim 1.

12. A cementitious product according to claim 11 wherein the glass filament is made up of alkali-resistant glass fibers.

13. A cementitious product according to claim 12 wherein the alkali-resistant glass fibers are made from a high zirconia glass composition.

14. A cementitious product according to claim 11 wherein the elastomer is a synthetic elastomeric material.

15. A cementitious product according to claim 14 wherein the elastomer is sytrene-butadiene rubber.

* * * * *